United States Patent
Desai et al.

(10) Patent No.: US 12,052,430 B2
(45) Date of Patent: Jul. 30, 2024

(54) ENERGY EFFICIENT CONTEXT RELEVANT PROCESSING FOR CONTENT

(71) Applicant: Apple Inc., Cupertino, CA (US)

(72) Inventors: Ranjit Desai, Cupertino, CA (US); Adrian P. Lindberg, San Jose, CA (US); Kaushik Raghunath, Pleasanton, CA (US); Vinay Palakkode, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/889,277

(22) Filed: Aug. 16, 2022

(65) Prior Publication Data

US 2023/0319296 A1  Oct. 5, 2023

Related U.S. Application Data

(60) Provisional application No. 63/325,087, filed on Mar. 29, 2022.

(51) Int. Cl.
| | |
|---|---|
| *H04N 19/33* | (2014.01) |
| *G06V 10/25* | (2022.01) |
| *G06V 10/70* | (2022.01) |
| *G06V 20/40* | (2022.01) |

(52) U.S. Cl.
CPC ............ *H04N 19/33* (2014.11); *G06V 10/25* (2022.01); *G06V 10/70* (2022.01); *G06V 20/46* (2022.01)

(58) Field of Classification Search
CPC ........ H04N 19/33; G06V 10/25; G06V 20/46; G06V 10/70
USPC .................................................... 375/240.12
See application file for complete search history.

(56) References Cited

U.S. PATENT DOCUMENTS

| | | | |
|---|---|---|---|
| 2013/0226850 A1* | 8/2013 | Hannuksela | G06F 16/58 706/14 |
| 2019/0176027 A1* | 6/2019 | Smith | G06F 3/011 |
| 2019/0362557 A1 | 11/2019 | Lacey et al. | |
| 2020/0160528 A1* | 5/2020 | Rhodes | G06T 9/002 |
| 2021/0004589 A1* | 1/2021 | Turkelson | G06V 10/82 |
| 2021/0064774 A1 | 3/2021 | Collart | |
| 2021/0072889 A1* | 3/2021 | Simmons | G06F 3/017 |
| 2021/0142497 A1* | 5/2021 | Pugh | G06T 19/006 |
| 2021/0318558 A1 | 10/2021 | Tzvieli et al. | |
| 2021/0350597 A1 | 11/2021 | Vembar et al. | |
| 2021/0383912 A1 | 12/2021 | Jackson et al. | |
| 2021/0398507 A1* | 12/2021 | Hicks | G09G 5/377 |
| 2022/0005259 A1 | 1/2022 | Surti et al. | |
| 2022/0012922 A1* | 1/2022 | Ishikawa | G06F 3/017 |
| 2022/0300740 A1* | 9/2022 | Sahu | G06F 18/214 |
| 2022/0374714 A1* | 11/2022 | Nayak | G06N 3/09 |

FOREIGN PATENT DOCUMENTS

KR  102204212 B1 *  1/2021

OTHER PUBLICATIONS

International Search Report and Written Opinion from PCT/US2020/015582, dated Jul. 5, 2023, 15 pages.

* cited by examiner

*Primary Examiner* — Kathleen M Walsh
(74) *Attorney, Agent, or Firm* — BAKERHOSTETLER

(57) ABSTRACT

A method is provided that includes receiving content data captured by a sensor and receiving a context signal representing a user context. The received content data is scaled using a trained model, wherein the context signal is an input to the trained model, and the scaled content data is provided for presentation to a user.

21 Claims, 5 Drawing Sheets

ENERGY EFFICIENT CONTEXT RELEVANT PROCESSING FOR CONTENT

CROSS-REFERENCE TO RELATED APPLICATIONS

This application claims the benefit of priority to U.S. Provisional Patent Application No. 63/325,087, entitled "Energy Efficient Context Relevant Processing for Content," filed on Mar. 29, 2022 the disclosure of each of which is hereby incorporated herein in its entirety.

TECHNICAL FIELD

The present description relates generally to electronic devices including, for example, electronic devices used for presenting mixed reality experiences.

BACKGROUND

A mixed reality environment may refer to a simulated environment that is designed to incorporate sensory inputs from a physical environment. Electronic devices used to present mixed reality environments rely on sensors such as cameras and microphones to capture content data from the physical environment. Many of these electronic devices have power constraints that limit the amount of processing that can be done on the device.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A mixed reality environment may refer to a simulated environment that is designed to incorporate sensory inputs from a physical environment. Electronic devices used to present mixed reality environments rely on sensors such as cameras and microphones to capture content data from the physical environment. The power expended to capture the content data is directly proportional to the resolution of the images and audio signals captured using the cameras and microphones of the electronic device. In addition, post processing may be performed on the captured content data to remove artifacts and improve the quality. However, many of these electronic devices have power constraints that may limit the resolution available from the cameras and/or microphones and the amount of processing that can be done on the device.

The subject technology uses trained models to augment or scale content data captured by sensors in a context-aware manner. In addition to content data, inputs to the trained models include one or more context signals. The context signals include information about user context that is used by the trained models to augment or scale captured content data. Using trained models in this manner allows the size of the captured content data to be reduced either by reducing the resolution of the sensor used to capture the content data or by compressing the content data before sending the captured content data to another electronic device for processing. Reducing the resolution of the sensor reduces the amount of power consumed by the sensor when capturing content data. The reduced size of the captured content data reduces the amount of power needed to transmit the captured content data to another electronic device, and reduces latency in transmitting the captured content data since there is less data to transmit. Other benefits and advantages will become apparent in the following description that describes the subject technology in more detail.

Figure 1:
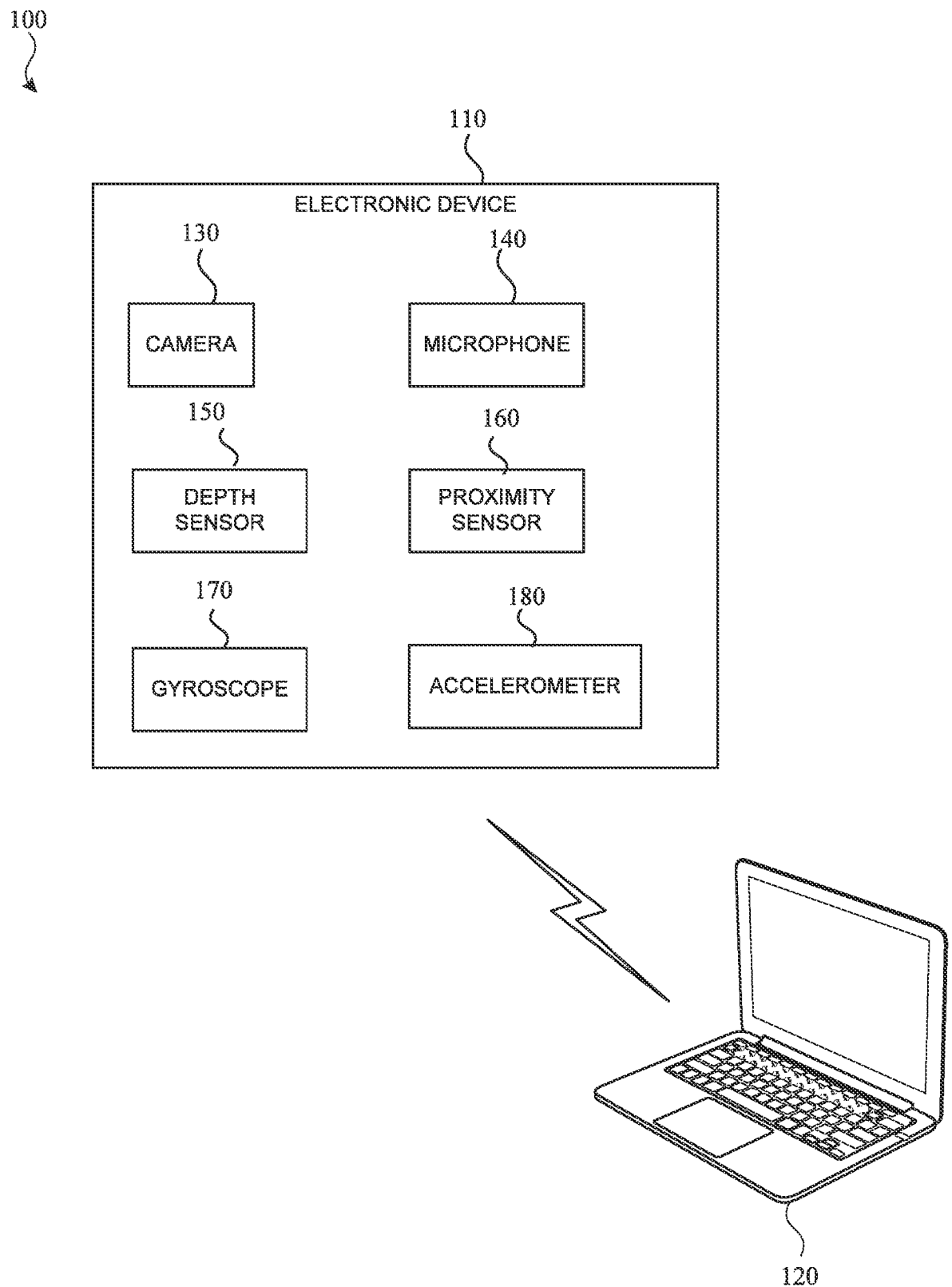
FIG. 1 illustrates an example environment in which the subject technology may operate in accordance with one or more implementations.

FIG. 1 illustrates an example environment in which the subject technology may operate in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated in FIG. 1, environment 100 includes electronic device 110 and electronic device 120. Electronic device 110 is an electronic device configured to present a mixed reality experience to a user of the device. Electronic device 110 may be a smartphone, a tablet, a head-mountable device (HMD), etc. Electronic device 110 includes input sensors configured to capture content data from the physical environment of the user for processing to present the mixed reality experience. The input sensors include, but are not limited to, camera 130, microphone 140, depth sensor 150, proximity sensor 160, gyroscope 170, and accelerometer 180. While only one instance of each of these input sensors is depicted in FIG. 1, electronic device 110 may have multiple instances of one or more of the various input sensors. For example, electronic device 110 may have multiple cameras configured with different points of view and/or having different capabilities (e.g., color, black-and-white, high-resolution, etc.). Similarly, electronic device 110 may have multiple microphones or microphone arrays configured to capture sound from different directions relative to the user of the device. Not depicted in FIG. 1, electronic device 110 also includes processing components for managing the operations of electronic device 110 and its various components, display components for presenting visual content to the user, and audio output components for presenting audio content to the user.

Electronic device 120 is a computing device in wireless communication with electronic device 110. Electronic device 120 is configured to assist electronic device 110 with processing tasks associated with presenting a mixed reality experience that are offloaded from electronic device 110 to electronic device 120. Processing tasks may be offloaded to conserve power on electronic device 110 and/or to take advantage of processing power available on electronic device 120. Wireless communications between electronic device 110 and electronic device 120 may utilize any wireless technology including, but not limited to, Wi-Fi, Bluetooth, ultra wideband (UWB), etc. Electronic device 120 is depicted as a laptop computer. However, electronic device 120 may be implemented using other types of devices including, but not limited to, desktop computers, tablet devices, or any device capable of executing one or more computer programs to provide processing in support of presenting a mixed reality experience on electronic device 110 or other processing tasks offloaded from electronic device 110.

Figure 2:
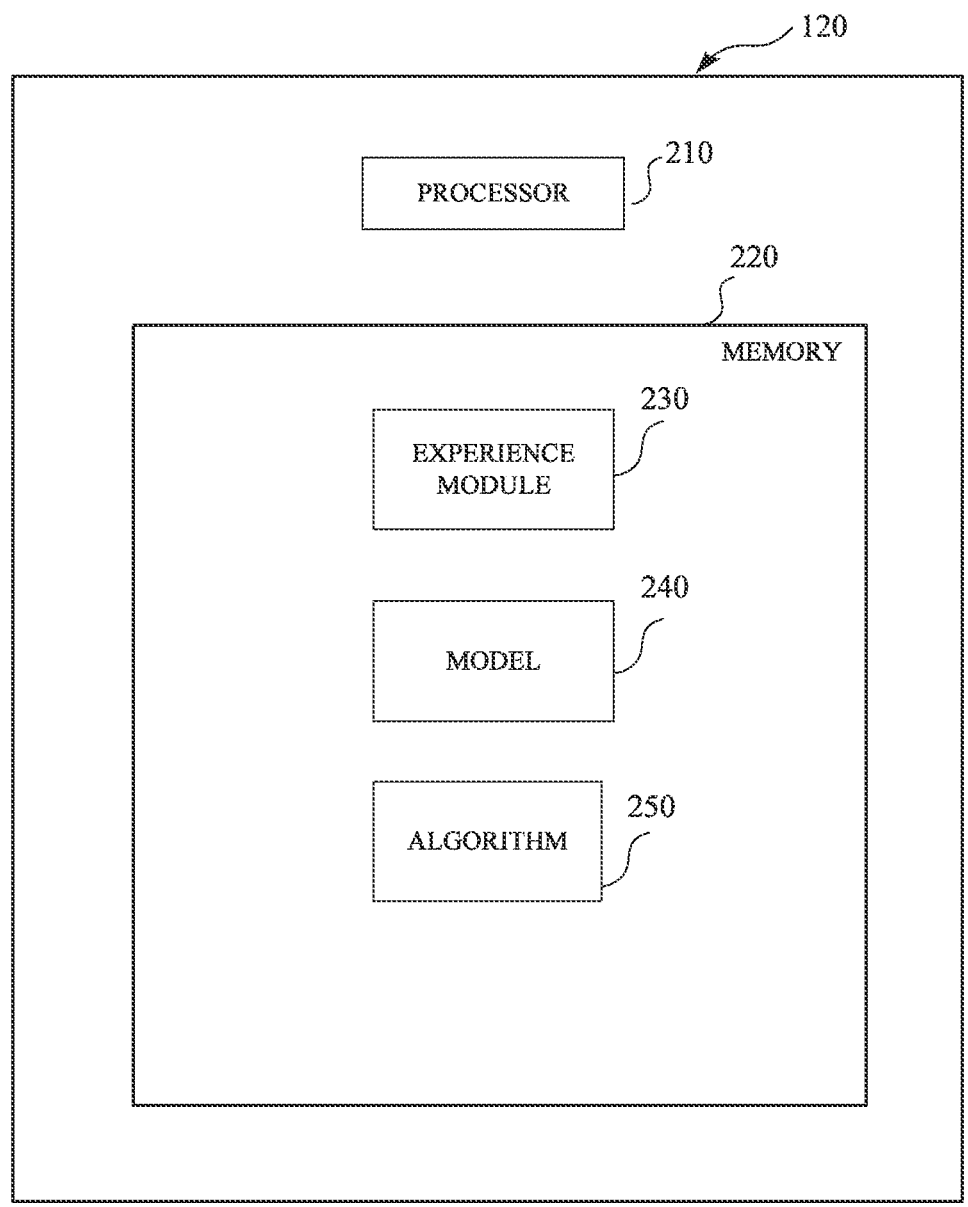
FIG. 2 is a block diagram illustrating components of an electronic device in accordance with one or more implementations of the subject technology.

FIG. 2 is a block diagram illustrating components of an electronic device in accordance with one or more implementations of the subject technology. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

In the example depicted in FIG. 2, electronic device 120 includes processor 210 and memory 220. Processor 210 may include suitable logic, circuitry, and/or code that enable processing data and/or controlling operations of electronic device 120. In this regard, processor 210 may be enabled to provide control signals to various other components of electronic device 120. Processor 210 may also control transfers of data between various portions of electronic device 120. Additionally, the processor 210 may enable implementation of an operating system or otherwise execute code to manage operations of electronic device 120.

Processor 210 or one or more portions thereof, may be implemented in software (e.g., instructions, subroutines, code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Memory 220 may include suitable logic, circuitry, and/or code that enable storage of various types of information such as received data, generated data, code, and/or configuration information. Memory 220 may include, for example, random access memory (RAM), read-only memory (ROM), flash memory, and/or magnetic storage. As depicted in FIG. 2, memory 220 contains experience module 230, model 240, and algorithm 250. The subject technology is not limited to these components both in number and type, and may be implemented using more components or fewer components than are depicted in FIG. 2.

According to aspects of the subject technology, experience module 230 comprises a computer program having one or more sequences of instructions or code together with associated data and settings. Upon executing the instructions or code, one or more processes are initiated to manage communications with electronic device 110 and support the presentation of a mixed reality experience using electronic device 110. Supporting the presenting of a mixed reality experience may include receiving content data captured using one or more sensors on electronic device 110, augmenting or scaling the content data using a trained model, providing the content data to an algorithm for further processing, and/or providing the content data for presentation to a user. These operations are described in further detail below.

According to aspects of the subject technology, model 240 comprises a computer program having one or more sequences of instructions or code together with associated data and settings. Upon executing the instructions or code, one or more processes are initiated to provide a machine learning model trained to augment or scale content data based on context signals. The content may be video data, such as an image frame, or audio data. Augmenting or scaling the content data may include increasing the resolution of the content data, or a portion of the content data, from a first resolution to a second resolution greater than the first resolution. The level of increasing the resolution and/or the portion of the content data that is augmented or scaled may be based on context signals received as inputs to model 240. Augmenting the content data also may include changing a format of the content data such as color scheme (e.g., 4:4:4, 4:2:2, etc.). Augmenting the content data also may include providing missing information from the content data. For example, visual content that is behind an object in a current view of a scene may be provided based on historical data or learned context from previous images of the scene from different points of view.

Context signals provide information on the context of a user using electronic device 110 to participate in a mixed reality experience. Context signals may include specific user contexts such as a region of interest in the content data, user gaze, user head position, a trajectory of the user, etc. Context signals also may include temporal information such as motion vectors indicating a direction of movement by the user or an object in the scene, marked positions of an object in the scene over time, etc. Context signals also may include information on the type of content being consumed in the mixed reality experience. For example, the content type may include attending a live event, watching an event or movie on a screen, taking a nature walk, etc. A mixed reality experience of taking a nature walk may be improved by providing more resolution to a region of interest that the user may be looking at to see details in plants or animals while watching a sporting event may be enjoyed without emphasizing any portion of the captured content data. Context signals also may include experience goals. For example, a co-present experience with other users might focus on the audio/video data being streamed from the other participants in the experience. A collaboration experience may focus on the object or document being worked on by a group of users. The subject technology is not limited to the examples of context signals described above and may be implemented using other types of context signals.

Model 240 may be trained using datasets comprising content data (e.g., visual and/or audio data) processed for the different types of context signals. Model 240 may be a single model trained for multiple different types of context signals. Alternatively, model 240 may represent a group of models that are each trained for respective context signal types or groups of context signal types. In this alternative arrangement, experience module 230 may select a trained model from the group of models based on context signals associated with the mixed reality experience being run on electronic device 110.

Algorithm 250 comprises a computer program having one or more sequences of instructions or code together with associated data and settings. Upon executing the instructions or code, one or more processes are initiated to further process the augmented or scaled content data output by model 240. Algorithm 250 may represent a computer vision algorithm configured to determine scene geometry, track objects, classify objects, provide alternative or peripheral views of a scene, etc. Algorithm 250 also may represent video and/or audio processing algorithms configured to put the augmented or scaled content data in better or a different form for presenting to the user. Algorithm 250 may represent a single algorithm or a group of algorithms that is selected from by experience module 230 based on the mixed reality experience being run. If algorithm 250 has a preferred data format, an identifier for algorithm 250 may be a context signal for model 240 to place the augmented or scaled content data in the preferred data format.

Figure 3:
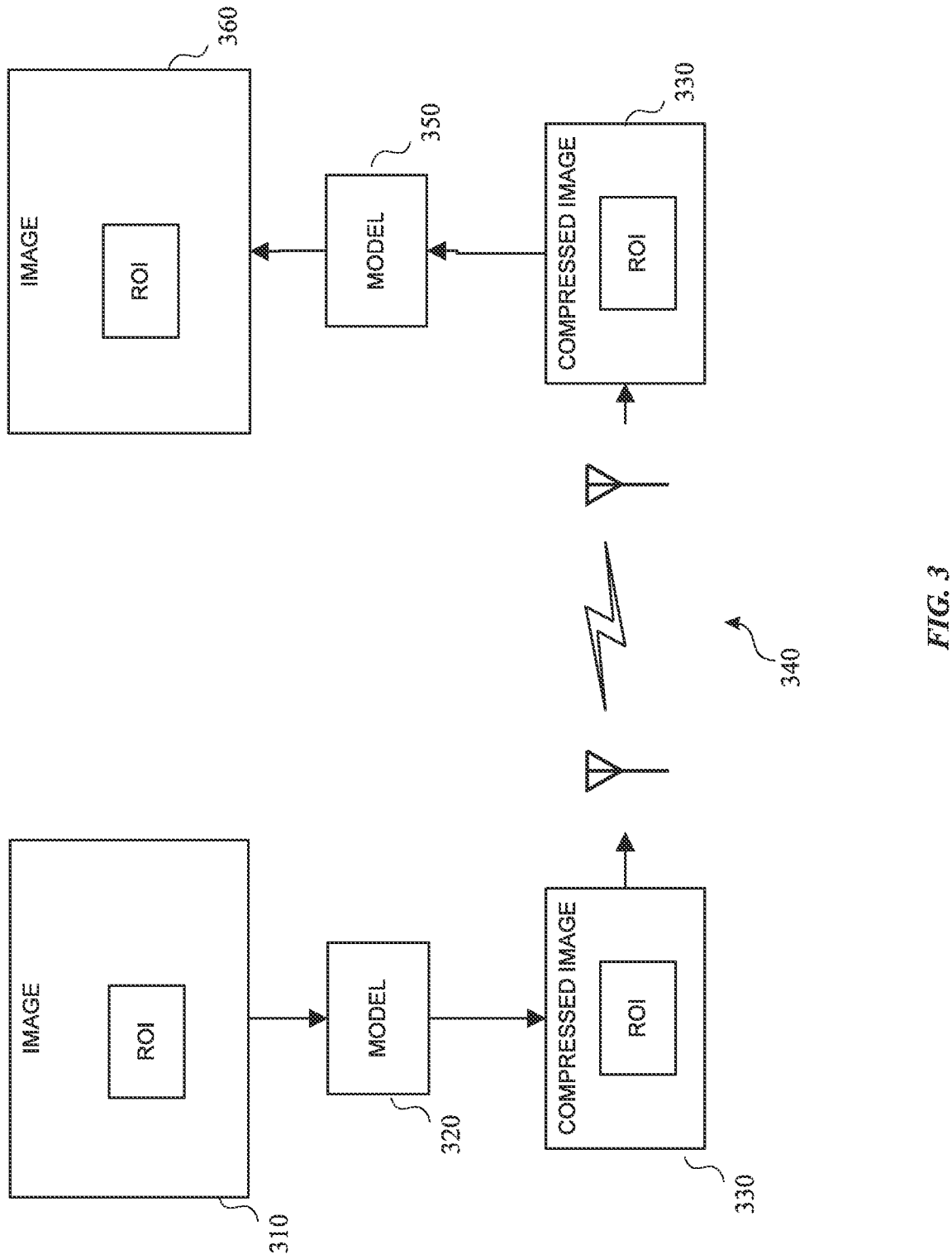
FIG. 3 is a block diagram illustrating a process flow according to aspects of the subject technology.

FIG. 3 is a block diagram illustrating a process flow according to aspects of the subject technology. In the depicted example, image 310 represents content data captured by a sensor (e.g., camera 130) of electronic device 110. In this example, electronic device 110 uses trained model 320 to scale down image 310 by compressing image 310 in a context-aware manner. Trained model 320 receives a context signal as an input, where the context signal identifies a region of interest (ROI) within image 310. Trained model 320 compresses image 310 to generate compressed image 330. Based on the context signal, trained model 320 may preserve most or all of the detail within the ROI of image 310 while compressing the data of image 310 outside of the ROI.

Compressed image 330 is transmitted to an electronic device (e.g., electronic device 120) via wireless connection 340. Wireless connection 340 may use any wireless technology such as Wi-Fi, Bluetooth, UWB, etc. The reduced size of compressed image 330 relative to image 310 saves power and reduces latency when transmitted over wireless connection 340.

Trained model 350 is used to scale up compressed image 330 to generate image 360. Trained model 350 receives a context signal similar to that received by trained model 320 identifying the ROI within compressed image 330. Based on the context signal, trained model 350 preserves the detail within the ROI when generating image 360. Image 360 may be identical to image 310 or image 360 may be augmented or scaled to be different from image 310 based on context signals received by trained model 350.

In the example depicted in FIG. 3, trained model 320 is used to compress image 310 down in size prior to being transmitted as compressed image 330. In other examples, a resolution of the image sensor used to capture the image content data may be adjusted to generate an image having a lower resolution. The lower resolution image may be transmitted to an electronic device and then scaled up by trained model 350 based on context signals received as inputs to trained model 350. This example saves additional power due to the lower resolution used by the image sensor.

Figure 4:
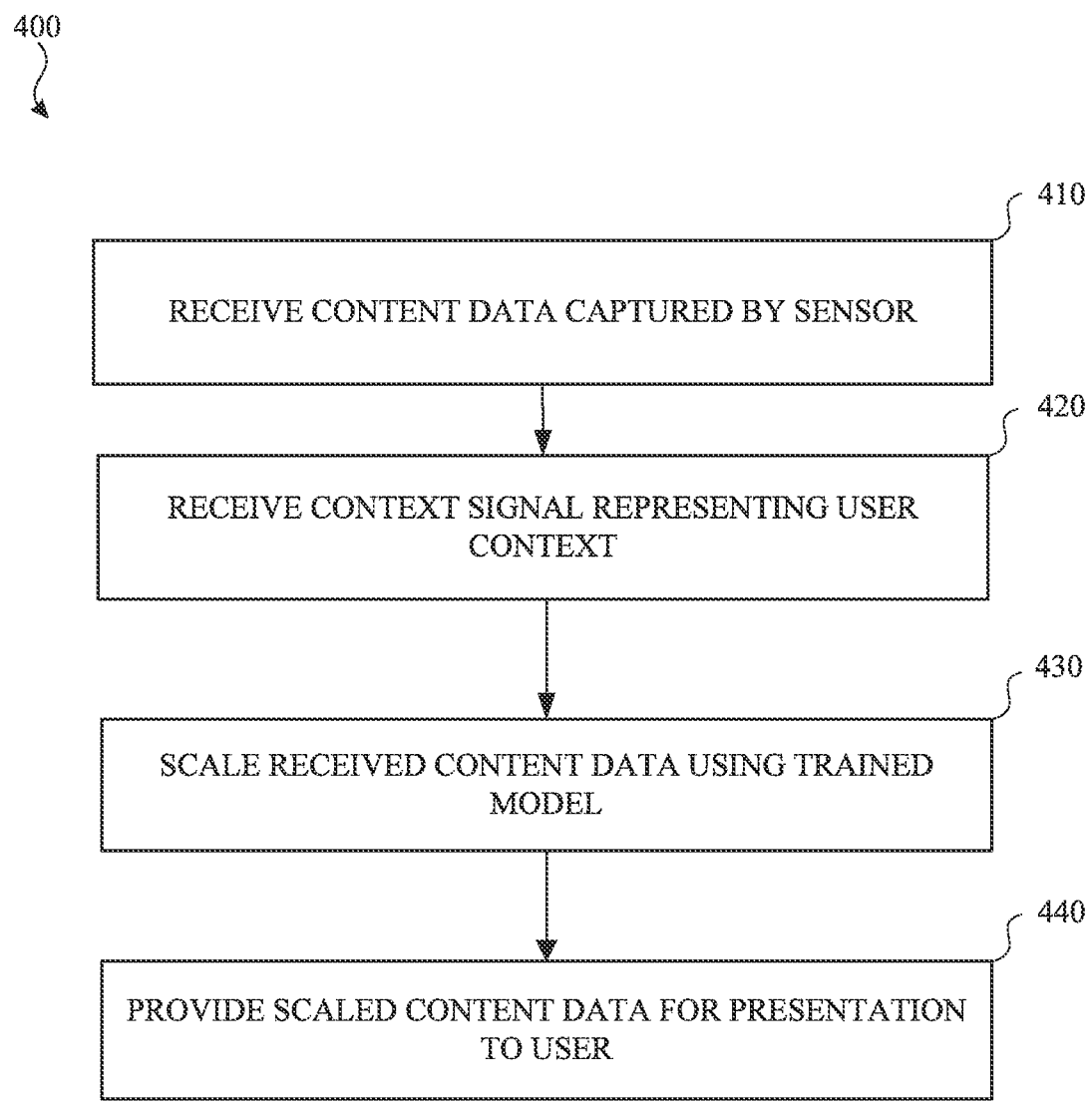
FIG. 4 illustrates an example process for processing content data according to aspects of the subject technology.

FIG. 4 illustrates an example process for processing content data according to aspects of the subject technology. For explanatory purposes, the blocks of process 400 are described herein as occurring in serial, or linearly. However, multiple blocks of process 400 may occur in parallel. In addition, the blocks of process 400 need not be performed in the order shown and/or one or more blocks of process 400 need not be performed and/or can be replaced by other operations.

Example process 400 may be initiated upon receipt of content data captured by a sensor (block 410). For example, electronic device 110 may transmit content data captured using camera 130 to electronic device 120. One or more context signals representing user context may be received (block 420). The context signals may come from sensors on electronic device 110, from experience module 230, or from any component involved in the mixed reality experience being presented on electronic device 110. The received content data is scaled using a trained model with the one or more context signals as inputs to the trained model (block 430). The scaled content data may be provided for presentation to the user (block 440). For example, the scaled content data may be transmitted back to electronic device 110 for presentation or may first be processed by a processing algorithm such as an image processing algorithm before being provided for display to the user.

Figure 5:
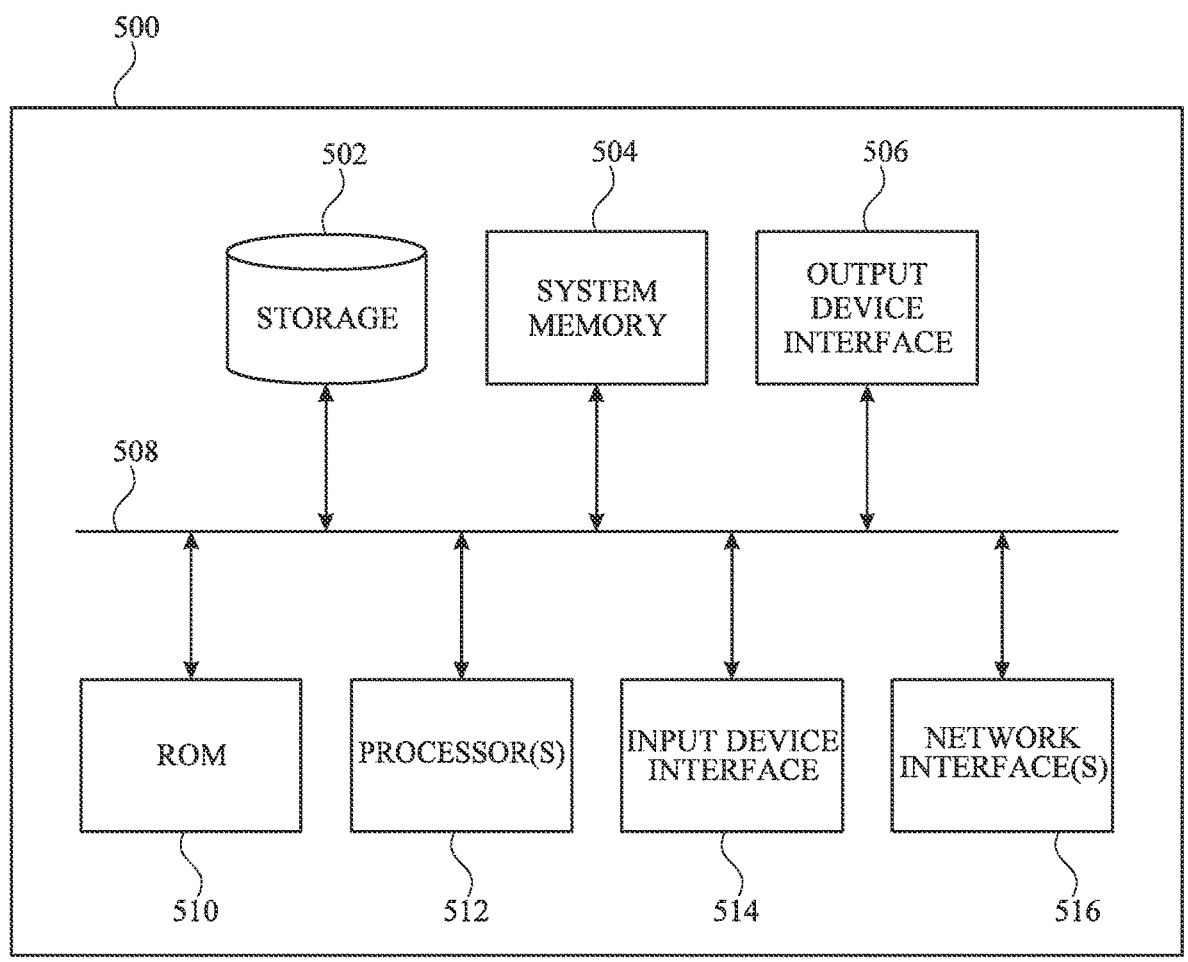
FIG. 5 illustrates an example electronic system with which aspects of the subject technology may be implemented.

FIG. 5 illustrates an electronic system 500 with which one or more implementations of the subject technology may be implemented. Electronic system 500 can be, and/or can be a part of, electronic device 120 shown in FIG. 1. The electronic system 500 may include various types of computer readable media and interfaces for various other types of computer readable media. The electronic system 500 includes a bus 508, one or more processing unit(s) 512, a system memory 504 (and/or buffer), a ROM 510, a permanent storage device 502, an input device interface 514, an output device interface 506, and one or more network interfaces 516, or subsets and variations thereof.

The bus 508 collectively represents all system, peripheral, and chipset buses that communicatively connect the numerous internal devices of the electronic system 500. In one or more implementations, the bus 508 communicatively connects the one or more processing unit(s) 512 with the ROM 510, the system memory 504, and the permanent storage device 502. From these various memory units, the one or more processing unit(s) 512 retrieves instructions to execute and data to process in order to execute the processes of the subject disclosure. The one or more processing unit(s) 512 can be a single processor or a multi-core processor in different implementations.

The ROM 510 stores static data and instructions that are needed by the one or more processing unit(s) 512 and other modules of the electronic system 500. The permanent storage device 502, on the other hand, may be a read-and-write memory device. The permanent storage device 502 may be a non-volatile memory unit that stores instructions and data even when the electronic system 500 is off. In one or more implementations, a mass-storage device (such as a magnetic or optical disk and its corresponding disk drive) may be used as the permanent storage device 502.

In one or more implementations, a removable storage device (such as a floppy disk, flash drive, and its corresponding disk drive) may be used as the permanent storage device 502. Like the permanent storage device 502, the system memory 504 may be a read-and-write memory device. However, unlike the permanent storage device 502, the system memory 504 may be a volatile read-and-write memory, such as random access memory. The system memory 504 may store any of the instructions and data that one or more processing unit(s) 512 may need at runtime. In one or more implementations, the processes of the subject disclosure are stored in the system memory 504, the permanent storage device 502, and/or the ROM 510. From these various memory units, the one or more processing unit(s) 512 retrieves instructions to execute and data to process in order to execute the processes of one or more implementations.

The bus 508 also connects to the input and output device interfaces 514 and 506. The input device interface 514 enables a user to communicate information and select commands to the electronic system 500. Input devices that may be used with the input device interface 514 may include, for example, alphanumeric keyboards and pointing devices (also called "cursor control devices"). The output device interface 506 may enable, for example, the display of images generated by electronic system 500. Output devices that may be used with the output device interface 506 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 5, the bus 508 also couples the electronic system 500 to one or more networks and/or to one or more network nodes, such as the content provider 112 shown in FIG. 1, through the one or more network interface(s) 516. In this manner, the electronic system 500 can be a part of a network of computers (such as a LAN, a wide area network ("WAN"), or an Intranet, or a network of networks, such as the Internet. Any or all components of the electronic system 500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

The head-mountable device can be worn by a user to display visual information within the field of view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mountable device. Other outputs provided by the head-mountable device can include speaker output and/or haptic feedback. A user may further interact with the head-mountable device by providing inputs for processing by one or more components of the head-mountable device. For example, the user can provide tactile inputs, voice commands, and other inputs while the device is mounted to the user's head.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In accordance with the subject disclosure, a method is provided that includes receiving content data captured by a sensor and receiving a context signal representing a user context. The received content data is scaled using a trained model, wherein the context signal is an input to the trained model, and the scaled content data is provided for presentation to a user.

The received content data may have a first resolution, and the scaled content data may have a second resolution greater than the first resolution. The second resolution may be based on the context signal. The sensor may be a camera and the content data may comprise video data. The context signal may identify a region of interest in the content data, and wherein the region of interest is scaled to a greater resolution than a resolution of the content data outside of the region of interest. The sensor may be a microphone and the content data may comprise audio data.

A resolution of the sensor may be set based on the context signal. The context signal may comprise a content type. The method may further include providing the scaled content to a processing algorithm, wherein the content data is scaled based on the processing algorithm. The content data may be received via a wireless connection. The method may further include selecting the trained model from a plurality of models based on the received context signal.

In accordance with the subject disclosure, a non-transitory computer-readable medium storing instructions is provided which, when executed by one or more processors, cause the one or more processors to perform operations. The operations include receiving content data captured by a sensor and receiving a context signal representing a user context. The operations further include scaling the received content data using a trained model, wherein the context signal is an input to the trained model and providing the scaled content data to a processing algorithm for further processing.

The received content data may have a first resolution, and the scaled content data may have a second resolution greater than the first resolution. The second resolution may be based on the context signal. The context signal may identify a region of interest in the content data, and wherein the region of interest may be scaled to a greater resolution than a resolution of the content data outside of the region of interest. The context signal may comprise a content type. The content data may be received via a wireless connection.

In accordance with the subject disclosure, a device is provided that includes a memory storing a plurality of computer programs, and one or more processors configured to execute instructions of the plurality of computer programs. When executed, the instructions receive content data captured by a sensor, receive a context signal representing a user context, augment the received content data using a trained model, wherein the context signal is an input to the trained model, and provide the augmented content data to a processing algorithm for further processing.

The received content data may be augmented by scaling the received content data from a first resolution to a second resolution greater than the first resolution. The context signal may identify a region of interest in the content data, and wherein the region of interest may be scaled to a greater resolution than a resolution of the content data outside of the region of interest.

As described herein, aspects of the subject technology may include the collection and transfer of data from an application to other computing devices. The present disclosure contemplates that in some instances, this collected data may include personal information data that uniquely identifies or can be used to identify a specific person. Such personal information data can include demographic data, location-based data, online identifiers, telephone numbers, email addresses, home addresses, images, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used as context signals. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of video conferencing, the present technology can be configured to allow users to select to "opt in" or "opt out"

of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
receiving content data captured using a sensor;
receiving a context signal representing a user context, the context signal comprising an indication of a content type of the content data;
scaling the received content data using a trained model, wherein the context signal is an input to the trained model; and
providing the scaled content data for presentation to a user.

2. The method of claim 1, wherein the received content data has a first resolution, and the scaled content data has a second resolution greater than the first resolution.

3. The method of claim 2, wherein the second resolution is based on the context signal.

4. The method of claim 1, wherein the sensor is a camera and the content data comprises video data.

5. The method of claim 4, wherein the context signal identifies a region of interest in the content data, and wherein the region of interest is scaled to a greater resolution than a resolution of the content data outside of the region of interest.

6. The method of claim 1, wherein the sensor is a microphone and the content data comprises audio data.

7. The method of claim 1, wherein a resolution of the sensor is set based on the context signal.

8. The method of claim 1, wherein the context signal further comprises an indication of a type of experience corresponding to the content data, the type of experience comprising at least one of a mixed reality experience, a collaboration experience, or a live event experience.

9. The method of claim 1, further comprising:
providing the scaled content to a processing algorithm, wherein the content data is scaled based on the processing algorithm.

10. The method of claim 1, wherein the content data is received via a wireless connection.

11. The method of claim 1, further comprising selecting the trained model from a plurality of models based on the received context signal.

12. A non-transitory computer-readable medium storing instructions which, when executed by one or more processors, cause the one or more processors to perform operations comprising:
receiving content data captured using a sensor;
receiving a context signal representing a user context;
scaling the received content data using a trained model and based at least in part on a processing algorithm to be performed on the scaled content data, wherein the context signal is an input to the trained model; and
providing the scaled content data to the processing algorithm for further processing separate from the scaling.

13. The non-transitory computer-readable medium of claim 12, wherein the received content data has a first resolution, and the scaled content data has a second resolution greater than the first resolution.

14. The non-transitory computer-readable medium of claim 13, wherein the second resolution is based on the context signal.

15. The non-transitory computer-readable medium of claim 14, wherein the context signal identifies a region of interest in the content data, and wherein the region of interest is scaled to a greater resolution than a resolution of the content data outside of the region of interest.

16. The non-transitory computer-readable medium of claim 12, wherein the context signal comprises a content type.

17. The non-transitory computer-readable medium of claim 12, wherein the content data is received via a wireless connection.

18. A device, comprising:
a memory storing a plurality of computer programs; and
one or more processors configured to execute instructions of the plurality of computer programs to:
receive content data captured using a sensor;
receive a context signal representing a user context;
augment the received content data using a trained model to unobscure an obstructed object in the received content data, wherein the context signal is an input to the trained model; and
provide the augmented content data to a processing algorithm for further processing.

19. The device of claim 18, wherein the received content data is augmented by scaling the received content data from a first resolution to a second resolution greater than the first resolution.

20. The device of claim 19, wherein the context signal identifies a region of interest in the content data, and wherein the region of interest is scaled to a greater resolution than a resolution of the content data outside of the region of interest.

21. The non-transitory computer-readable medium of claim 12, wherein the processing algorithm performs at least one of: determining scene geometry corresponding to the content data, tracking an object represented in the content data, or classifying the object represented in the content data.

* * * * *